US009126559B2

(12) United States Patent  
Ito

(10) Patent No.: US 9,126,559 B2  
(45) Date of Patent: Sep. 8, 2015

(54) METHOD FOR FORMING PREARRANGED RUPTURE PORTION FOR AIR BAG DOOR

(75) Inventor: Yuzo Ito, Anjo (JP)

(73) Assignee: INOAC CORPORATION, Aichi (JP)

(*) Notice: Subject to any disclaimer, the term of this patent is extended or adjusted under 35 U.S.C. 154(b) by 529 days.

(21) Appl. No.: 13/490,274

(22) Filed: Jun. 6, 2012

(65) Prior Publication Data

US 2013/0014627 A1 Jan. 17, 2013

(30) Foreign Application Priority Data

Jul. 11, 2011 (JP) ................................. 2011-153261

(51) Int. Cl.
  *B26D 3/06* (2006.01)
  *B60R 21/2165* (2011.01)
  *B29C 59/00* (2006.01)

(52) U.S. Cl.
  CPC .............. *B60R 21/2165* (2013.01); *B26D 3/06* (2013.01); *B29C 59/007* (2013.01); *B60R 2021/21654* (2013.01); *Y10T 83/0304* (2015.04)

(58) Field of Classification Search
  CPC .. B26D 7/2628; B26D 7/2635; B26D 7/2642; B26D 3/06; Y10T 83/0304; B60R 2021/21654; B29C 59/007
  USPC ........ 83/72–76, 368–372, 861–887; 700/195; 425/141; 280/728.1–733
  See application file for complete search history.

(56) References Cited

U.S. PATENT DOCUMENTS

| 4,338,032 | A  | * | 7/1982  | Bardsley et al. ............. 356/431 |
| 4,438,754 | A  | * | 3/1984  | Nanny et al. ..................... 125/14 |
| 4,920,495 | A  | * | 4/1990  | Pilkington .................... 700/195 |
| 5,094,574 | A  | * | 3/1992  | Nishigai et al. .............. 409/132 |
| 5,348,431 | A  | * | 9/1994  | Kusunoki et al. ............. 409/132 |
| 5,999,264 | A  | * | 12/1999 | Handa .......................... 356/512 |
| 6,152,003 | A  | * | 11/2000 | Jung ................................. 83/74 |
| 6,357,330 | B1 | * | 3/2002  | Dass et al. ...................... 83/863 |
| 6,882,434 | B1 | * | 4/2005  | Sandberg et al. ............. 356/601 |
| 7,036,411 | B1 | * | 5/2006  | Harris et al. ....................... 83/34 |
| 7,860,601 | B2 | * | 12/2010 | Piggott et al. ................. 700/175 |
| 2001/0022212 | A1 | * | 9/2001  | Kapteyn et al. .............. 156/250 |
| 2005/0147476 | A1 | * | 7/2005  | Wieners ......................... 408/21 |
| 2009/0278338 | A1 |   | 11/2009 | Takahiro et al. |
| 2012/0038077 | A1 | * | 2/2012  | Matsuno et al. ............. 264/40.5 |

FOREIGN PATENT DOCUMENTS

JP    2008-290643 A    12/2008

* cited by examiner

*Primary Examiner* — Ned Landrum  
*Assistant Examiner* — Fernando Ayala  
(74) *Attorney, Agent, or Firm* — DLA Piper LLP (US)

(57) ABSTRACT

A method for forming a prearranged rupture portion for an air bag door including the steps of setting an instrument panel on a fixing jig, and, then measuring, prior to forming grooves that make a prearranged rupture portion, the position of the back surface of a substrate of the instrument panel by a measuring device. When forming the first groove, the depth of the first groove formed by a working device is controlled with reference to a preset position of the set surface of the fixing jig, and when forming the second groove by the working device, correction is made depending on the position of the back surface of the substrate measured by the measuring device, and the depth of the second groove formed by the working device is controlled based on this corrected data

5 Claims, 5 Drawing Sheets

METHOD FOR FORMING PREARRANGED RUPTURE PORTION FOR AIR BAG DOOR

BACKGROUND OF THE INVENTION

1. Field of the Invention

The present invention relates to a method for forming a prearranged rupture portion for an air bag door in a vehicle interior member composed of a substrate and layered materials that cover a surface of the substrate and more particularly to a method for forming a prearranged rupture portion for an air bag door in a vehicle interior member that has a prearranged rupture portion defined by grooves formed on a back surface of the vehicle interior member.

2. Background Art

As shown in FIG. 5, an air bag device 14 is generally disposed on the backside of an instrument panel that is in front of the passenger seat of a vehicle. More specifically, an air bag door 12 of the air bag device 14 is provided on an instrument panel 10, and, when the air bag device 14 is activated, the air bag door 12 is ruptured along the prearranged rupture portion 16 to be opened, allowing an air bag 15 to be inflated and blown out toward the cabin of the vehicle. The prearranged rupture potion 16 of the air bag door 12 is a portion which is weakened by providing a groove 18 with a predetermined depth on the back surface of a substrate 20 that constitutes the instrument panel 10. Accordingly, the prearranged rupture portion 16 does not appear nor visible on the surface of the instrument panel 10.

The prearranged rupture portion 16 is required to be ruptured quickly and surely when the air bag device 14 is activated. On the other hand, the air bag door 12, in a state before the air bag device 14 is activated, forms a part of the instrument panel 10, and the prearranged rupture portion 16 is required to have a structural strength of such an extent that it does not cause unintended rupture or deformation. The ease of rupture and strength of the prearranged rupture portion 16 are defined by the size of thickness of the substrate 20 after the formation of the groove 18, i.e., the thickness of the rest of the substrate (hereinafter, referred to as "remaining thickness"). Further, in order to keep the balance between the ease of rupture and the strength of the prearranged rupture portion 16, it is required to precisely manage the remaining thickness of the substrate.

Examples of the method of forming the prearranged rupture portion 16 include a method of cutting to form a groove 18 with a predetermined depth from the back surface side of the substrate 20 after the molding of the substrate 20 into a desired shape. In this method, the prearranged rupture portion 16 is formed by cutting to form the groove 18 with a predetermined depth in the substrate 20 placed and fixed on a fixing jig, while moving a cutting blade such as an end mill in a predetermined direction. In this case, the remaining thickness is managed by controlling the position of the cutting blade relative to the set surface of the fixing jig by way of referring to positional data adapted to the set surface of the fixing jig formed so as to conform in to the shape of the surface of the substrate 20.

Generally, the surface of the substrate 20 of the instrument panel 10 is, as seen from FIG. 5, covered by a foamed layer 22 and a surface skin 24 (see, e.g., Japanese Patent Application Laid-Open (Kokai) No. 2008-290643). The prearranged rupture portion 16 of the air bag door 12 of this art is constituted from the groove 18, which is not perforating the substrate 20, and a groove (not shown), which is perforating through the substrate 20 and the foamed layer 22 to reach the surface skin 24. Since the surface skin 24 is generally softer than the substrate 20, the influence of the groove is likely to appear on the surface of the surface skin 24. Thus, the quality of the appearance is largely affected by the remaining thickness of the surface skin. In other words, with respect to the prearranged rupture portion 16 of the air bag door 12 disclosed in Japanese Patent Application Laid-Open (Kokai) No. 2008-290643, it is necessary to precisely manage each of the remaining thickness of the substrate and the remaining thickness of the surface skin.

The instrument panel 10 in a layered structure as described above has a disadvantage that the thickness of the foamed layer 22 is likely to vary compared with the thickness of the substrate 20. Accordingly, when the foamed layer 22 and the surface skin 24 are formed into a layered structure, errors in the thickness can accumulate, causing the precision of the thickness to be lowered compared with an instrument panel in which the substrate 20 has a single-layered structure. Further, in a method of cutting to form the groove 18 only in the substrate 20 with reference to the set surface of a fixing jig, if the sizes of thickness of the foamed layer 22 and the surface skin 24 are smaller than the designed sizes, then the remaining thickness of the substrate becomes larger. In addition, if the sizes of thickness of the foamed layer 22 and the surface skin are larger than the designed sizes then the remaining thickness of the substrate becomes smaller. Accordingly, it is not possible to precisely manage the remaining thickness of the substrate.

SUMMARY OF THE INVENTION

In view of the above-mentioned problems underlying the conventional arts, the present invention is to suitably solve these problems, and it is an object of the present invention to provide a method for forming a prearranged rupture portion for an air bag door capable of precisely forming a prearranged rupture portion correspondingly to the variance in sizes of thickness of vehicle interior members.

In order to solve the above-mentioned problems and to achieve the intended object, a method of the present invention is for forming a prearranged rupture portion for an air bag door, in a vehicle interior member composed of a substrate and layered materials covering a surface of the substrate in which the rupture portion comprises a first groove perforating from a back surface of the substrate through the substrate to reach the layered materials and a second groove formed only in the back surface of the substrate, the method comprising the steps of setting the vehicle interior member so that a surface of the layered materials is in touch with a set surface of a fixing means formed so as to adapt to the surface of the layered materials;

measuring a position of the back surface of the substrate by a measuring means; and forming the first and second grooves by a working means, wherein when forming the first groove, the working means controls a depth of the first groove with reference to a preset position of the set surface of the fixing means: and when forming the second groove, the working means controls a depth of the second groove depending on the position of the back surface of the substrate measured by the measuring means.

According to this method of the present invention, when forming the first groove which is perforated through the substrate to reach the layered materials, the depth for forming the first groove is controlled by referring to a preset position of the set surface formed so as to adapt to the surface of the layered materials. Accordingly, it is possible to keep the remaining thickness of the layered materials due to the formed first groove constant even in a case that there is an error in the size of thickness of the layered materials. Further, when forming the second groove, even if there is variance in sizes of thickness of the layered materials, it is possible to keep the remaining thickness of the substrate due to the formed second groove constant by controlling the depth for forming the second groove depending on the position of the back surface of the substrate that is measured by the measuring means.

In the method of the present invention described above, the working means corrects the size of thickness of the vehicle interior member depending on the position of the back surface of the substrate measured by the measuring means, and then the depth of formation of the second groove is controlled so as to adapt to the corrected size of thickness with reference to the position of the set surface. Accordingly, the depth of formation of the second groove is controlled so as to adapt to the size of thickness of the vehicle interior member, and it becomes possible to manage the remaining thickness of the substrate more precisely.

Further, in the method of the present invention, the measuring means measures a plurality of points of a working expected section of the grooves. Accordingly, not the entire back surface of the substrate but only a plurality of points of the formation expected section for the second groove are measured by the measuring means, and thus, a time required for measuring the formation expected section for the second groove can be reduced.

Furthermore, in the method of the present invention, the working means consecutively forms, while moving along the formation expected line, the first groove and the second groove that present in a mixed manner along the formation expected line for the prearranged rupture portion. Accordingly, since the position of the back surface of the substrate is measured by the measuring means prior to the formation of the first groove and the second groove, even if the first groove and the second groove are formed consecutively along the formation expected line for the prearranged rupture portion, wait for measurement by the measurement means does not occur, and the prearranged rupture portion can be formed in a short period of time.

As seen from the above, according to the method for forming a prearranged rupture portion for an air bag door of the present invention, a prearranged rupture portion of an air bag door can be precisely formed correspondingly to the variance in sizes of thickness of a foamed layer and a surface skin of the vehicle interior member.

BRIEF DESCRIPTION OF THE DRAWINGS

FIGS. 4(a), (b) and (c) are process drawings of a method for forming a prearranged rupture portion for an air bag door of the embodiment of the present invention, in which FIG. 4(a) shows a step of executing measurement with a measuring means, FIG. 4(b) shows a step of forming a first groove by a working means, and FIG. 4(c) shows a step of forming a second groove by the working means.

DETAILED DESCRIPTION OF PREFERRED EMBODIMENTS

Figure 1:
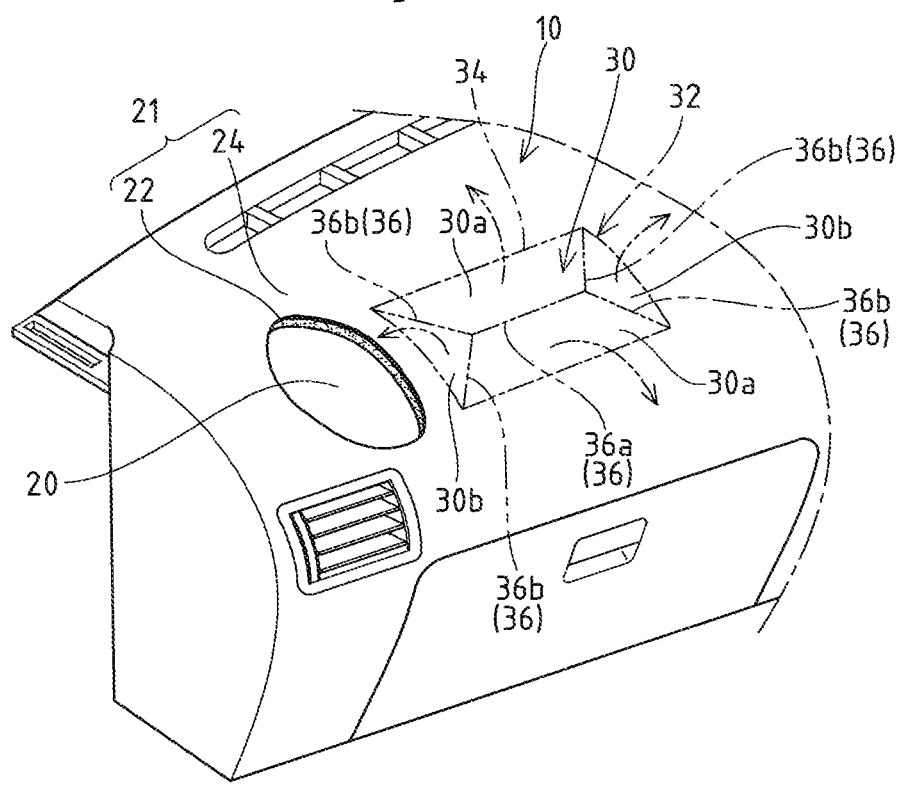
FIG. 1 is a schematic perspective view showing a part of an instrument panel provided with an air bag door.

A method for forming a prearranged rupture portion for an air bag door according to the present invention will be hereinafter described in detail by way of preferred embodiments, referring to the attached drawings. As illustrated in FIG. 1, in the shown embodiment, descriptions will be given for a case that an air bag door 30 defined by a prearranged rupture portion 32 is applied to an instrument panel 10.

Figure 3:
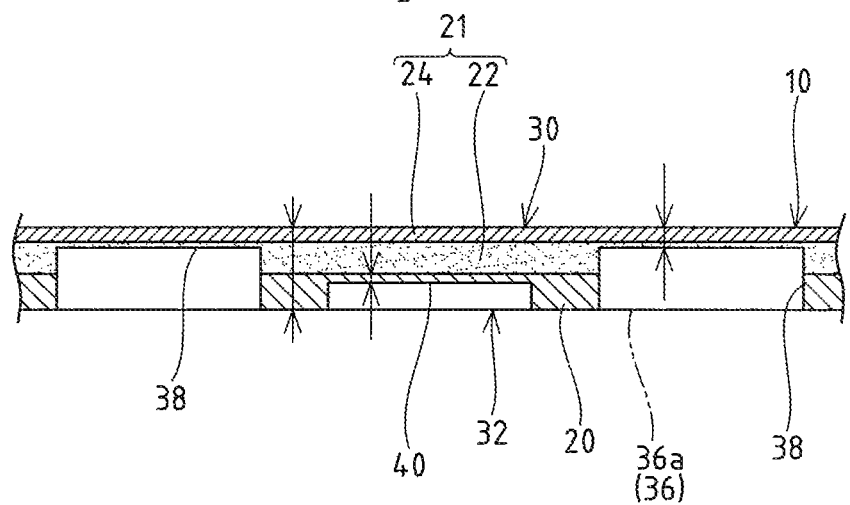
FIG. 3 is a sectional view taken along the line 3-3 in FIG. 2.

As shown in FIG. 1 or 3, an instrument panel 10 is of a multilayer structure composed of a substrate 20 and layered materials 21 covering one surface of this substrate 20 that faces the cabin of a vehicle. The substrate 20 constituting the back surface of the instrument panel 10 is a hard member obtained by molding a synthetic resin material such as polypropylene or AGS into a predetermined shape by means of injection molding or the like, and it secures the rigidity of the instrument panel 10. The layered materials 21 constitute a designed surface (or outer surface) of the instrument panel 10 and is constituted from a soft surface skin 24 such as TPO (olefin-based elastomer) or PVC (vinyl chloride) and a foamed layer 22 arranged between this surface skin 24 and the substrate 20 and made from a foam such as polyurethane or polypropylene.

Figure 2:
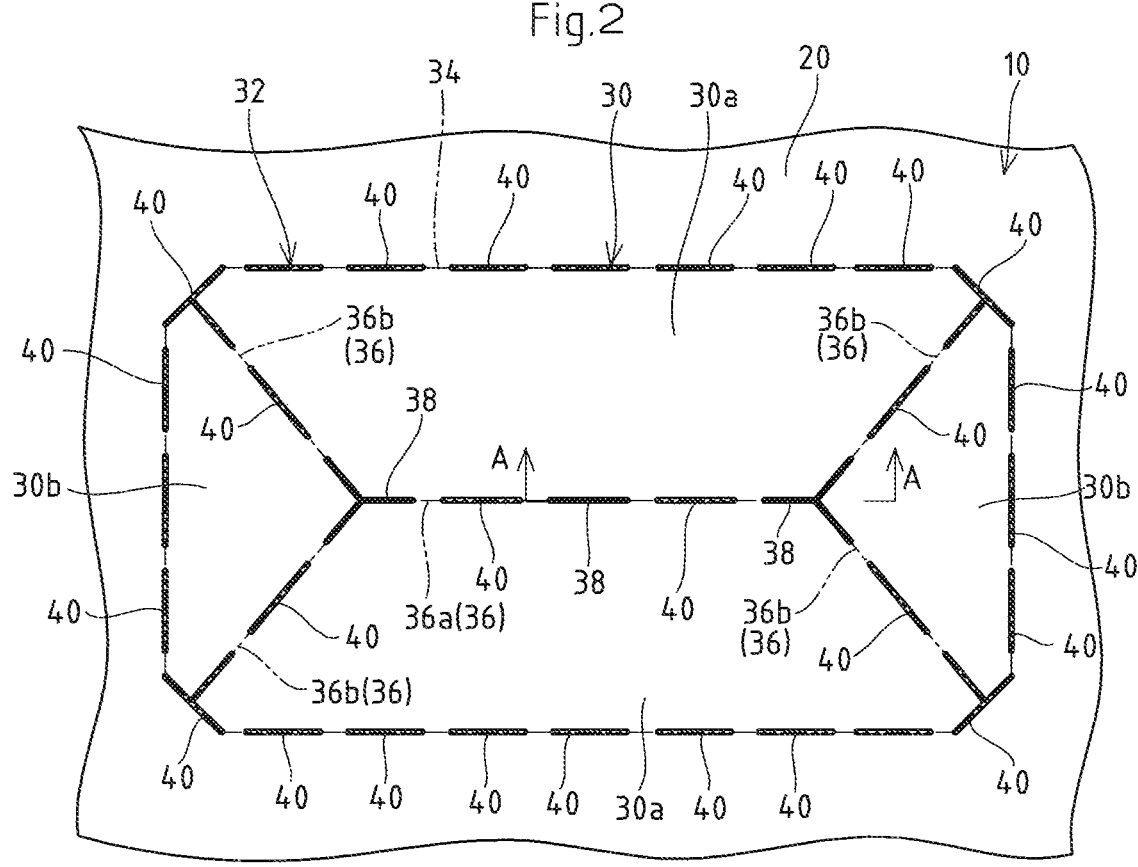
FIG. 2 is a plan view showing, from the back of the instrument panel, an air bag door of an embodiment of the present invention.

As shown in FIGS. 1 and 2, an air bag door 30 is what is called a four-door type that is designed to open by being divided into four door panels 30a and 30b at a prearranged rupture portion 32 when an air bag device is activated. The prearranged rupture portion 32 is composed of a first prearranged rupture line 34 extended in an approximately rectangular shape and a second prearranged rupture line 36 provided inside this first prearranged rupture line 34 to divide the adjoining door panels 30a and 30b. Further, each of the door panels 30a and 30b is designed to open such that each line for the first prearranged rupture line 34 is used as a hinge side. The second prearranged rupture line 36 is composed of a center line 36a extended at the center inside the first prearranged rupture line 34 and branched lines 36b branched in a V shape from the ends of this center line 36a. Furthermore, each of the branched lines 36b is connected to a corner of the first prearranged rupture line 34. In other words, the air bag door 30 is sectioned into two pieces of trapezoidal door panels 30a that are adjoining each other with the center line 36a in between and into two pieces of triangular door panels 30b surrounded by the branched lines 36b.

As shown in enlarged in FIG. 3 which is a sectional view taken along the line 3-3 in FIG. 2, the prearranged rupture portion 32 includes a first groove 38 perforating from the back surface of the substrate 20 through the substrate 20 to reach the layered materials 21, and it further includes a second groove 40 formed only in the back surface of the substrate 20. The first groove 38 reaches the foamed layer 22 from the back surface side of the substrate 20 and is designed such that a part of the foamed layer 22 and all of the surface skin 24 remain between the designed (or outer) surface of the instrument panel 10 and the bottom of the first groove 38. On the other hand, a section where the second groove 40 is formed is designed such that a part of the substrate 20 and all of the layered materials 21 remain between the designed surface of the instrument panel 10 and the bottom of the second groove 40. In this manner, the air bag door 30 is of an invisible type in which the grooves 38 and 40 are opened only toward the back of the substrate 20, and the prearranged rupture portion 32 does not appear on the designed surface of the instrument panel 10 that faces the interior of a vehicle. Further, the grooves 38 and 40 constituting the prearranged rupture portion 32 are provided intermittently along the above-mentioned prearranged rupture lines 34 and 36, and general portions between the adjoining grooves 38 and 40 and the grooves 38 and 40 are designed to be ruptured so to be guided by the rupture of the grooves 38 and 40 when the air bag device is activated. In addition, the first grooves 38 and the second grooves 40 are present in a mixed manner along the prearranged rupture lines 34 and 36, and at such a section as the center line 36a and the branched lines 36b crossing each other, either of the above-mentioned grooves 38 and 40 are basically provided. As seen from FIG. 2, the first grooves 38 are formed at sections where the rupture of the prearranged rupture portion 32 is to be started by being pressed by the air bag when the air bag device is activated, i.e., at a section where the center line 36a and the branched lines 36b are crossed or at a center section of the center line 36a.

A working device for forming the first grooves 38 and the second grooves 40 is, as shown in FIGS. 4(a) through 4(c), comprised of a fixing (positioning) jig (fixing or positioning means) 42 for fixing (positioning) the instrument panel 10, a working means 44 provided above this fixing jig 42 for working (forming) the grooves 38 and 40, and a measuring means 46 for measuring the position of the back surface of the substrate 20.

The fixing jig 42 has a set surface 42a formed so as to adapt to the designed surface of the instrument panel 10. The fixing jig 42 is capable of holding the instrument panel 10 so that the designed (or outer) surface of the instrument panel 10 is on its set surface 42a and the back surface of the instrument panel 10 (substrate 20) faces upward (outward).

The working means 44 is a triaxial robot arm having a tip portion configured to move in an X-Y axial direction (front-back and right-left directions), which is parallel to the set surface 42a of the fixing jig 42, and in a Z axial direction (up-down direction), in which the tip portion is moved forward and backward (up and down) with respect to the set surface 42a, thus allowing the tip portion to move in any direction with respect to the set surface 42a of the fixing jig 42. The tip portion is provided with an end mill 44a that has a cutting blade at its circumferential surface and end surface.

Accordingly, the working device operates so that the working means 44 descends toward the set surface 42a, thereby allowing the end mill 44a which is rotationally driven to cut into a predetermined depth of the instrument panel 10 to form the grooves 38 and 40 with required depths on the back surface of the instrument panel 10. In the working device, set data such as a position of the set surface 42a, size of thickness as a reference of the instrument panel 10, shape of the plane of the prearranged rupture portion 32 (grooves 38 and 40), arrangement patterns of the grooves 38 and 40, orders in which the grooves 38 and 40 are to be worked, and the like, are preset in its control means 48, and the operation of the working means 44 is controlled by the control means 48 depending on the set data and the results of measurement of the measuring means 46. Further, as positioning data of the set surface 42a, the data measured by the measuring means 46 are preferably used.

The measuring means 46 of the working device is disposed in the neighborhood of the tip portion of the working means 44, and it faces the back surface of the substrate 20 held on the set surface 42a of the fixing jig 42. The measuring means 46 is capable of measuring any section on the back surface of the instrument panel 10 (substrate 20) set on the set surface 42a of the fixing jig 42 by moving the working means 44 in the X-Y axial direction. The measuring means 46. more specifically, is a laser measuring equipment which is designed to measure the position of the back surface of the substrate 20 prior to forming the grooves 38 and 40 by the working means 44.

Next, a method of manufacturing the air bag door 30 using the working device over time will be described.

First, the instrument panel 10 is set so that the designed (or outer surface) surface abuts or is on the set surface 42a of the fixing jig 42, and the instrument panel 10 is fixed in the fixing jig 42 with its back surface (which is an opposite side from the designed or outer surface) facing the working means 44 and the measuring means 46.

Next, a position of the back surface of the instrument panel 10 (substrate 20) in the Z axial (vertical) direction is measured by the measuring means 46. Here, in this measuring step with the measuring means 46, the working means 44 is moved in the X-Y axial direction, thereby allowing a plurality of preset measuring points (e.g., about ten points) depending on, for instance, the formation expected sections for the grooves 38 and 40 to be respectively measured, and the respective results of measurements are input into the control means 48 (see FIG. 4(a)). The measuring points are designed to include the formation expected positions for the second grooves 40, and positions in the Z axial direction are measured for the formation expected positions for the first grooves 38 and the second grooves 40 in the back surface of the substrate 20. Further, the measuring step is performed at each time when each of the instrument panels 10 (or a new instrument panel 10) is set on the fixing jig 42, and a working step described later is carried out so as to adapt to the size of thickness of each individual instrument panel 10.

Positions of the set surface 42a in the Z axial direction corresponding to the measuring points are set as data of known values in advance, and thus, by measuring the position of the back surface of the substrate 20 in the measuring step, it is possible to understand the actual size of thickness (measured size of thickness) of the instrument panel 10 in the measuring points. Further, the size of thickness (referential size of thickness) as a reference in design, etc. of the instrument panel 10 is set in advance, and thus it is possible to find any error between the referential size of thickness and the measured size of thickness. Based on the error between the measured size of thickness calculated from the position of the back surface of the substrate 20 measured by the measuring means 38 and the referential size of thickness, the operational data of the working means 44 in the Z axial direction when forming the second grooves 40 are corrected. On the other hand, the operational data of the working means 44 in the Z axial direction when forming the first grooves 38 are not corrected depending on the position of the back surface of the substrate 20 measured by the measuring means 46, but the positional data of the set surface 42a in the Z axial direction preset in the control means 48 are used as a reference. Further, the correction in the measuring step may be performed depending on an average value or a deviation obtained as a result of measurements of a plurality of measuring points, or it may be performed for each of the measuring points.

The working means 44, while rotationally driving the end mill 44a, is moved along a predetermined formation expected line in the X-Y axial direction under the control of the control means 48. In other words, the working means 44 is moved in the formation expected positions for the first grooves 38 and the second grooves 40, forward and backward (up and down) in the Z axial direction with respect to the set surface 42a and in the X-Y axis direction, thereby forming the first grooves 38 and the second grooves 40 along the prearranged rupture lines 34 and 36. When forming the grooves 38 and 40, the forward and backward (up and down) movement of the working means 44 in the Z axial direction is basically controlled based on the position of the set surface 42a in the Z axial direction that is preset in the control means 48, and the depths of formations of the grooves 38 and 40 are adjusted so as to adapt to the three-dimensional shape of the instrument panel 10 which is curved in the X-Y axial direction (see FIG. 4(*b*) or (*c*)).

Figure 4:
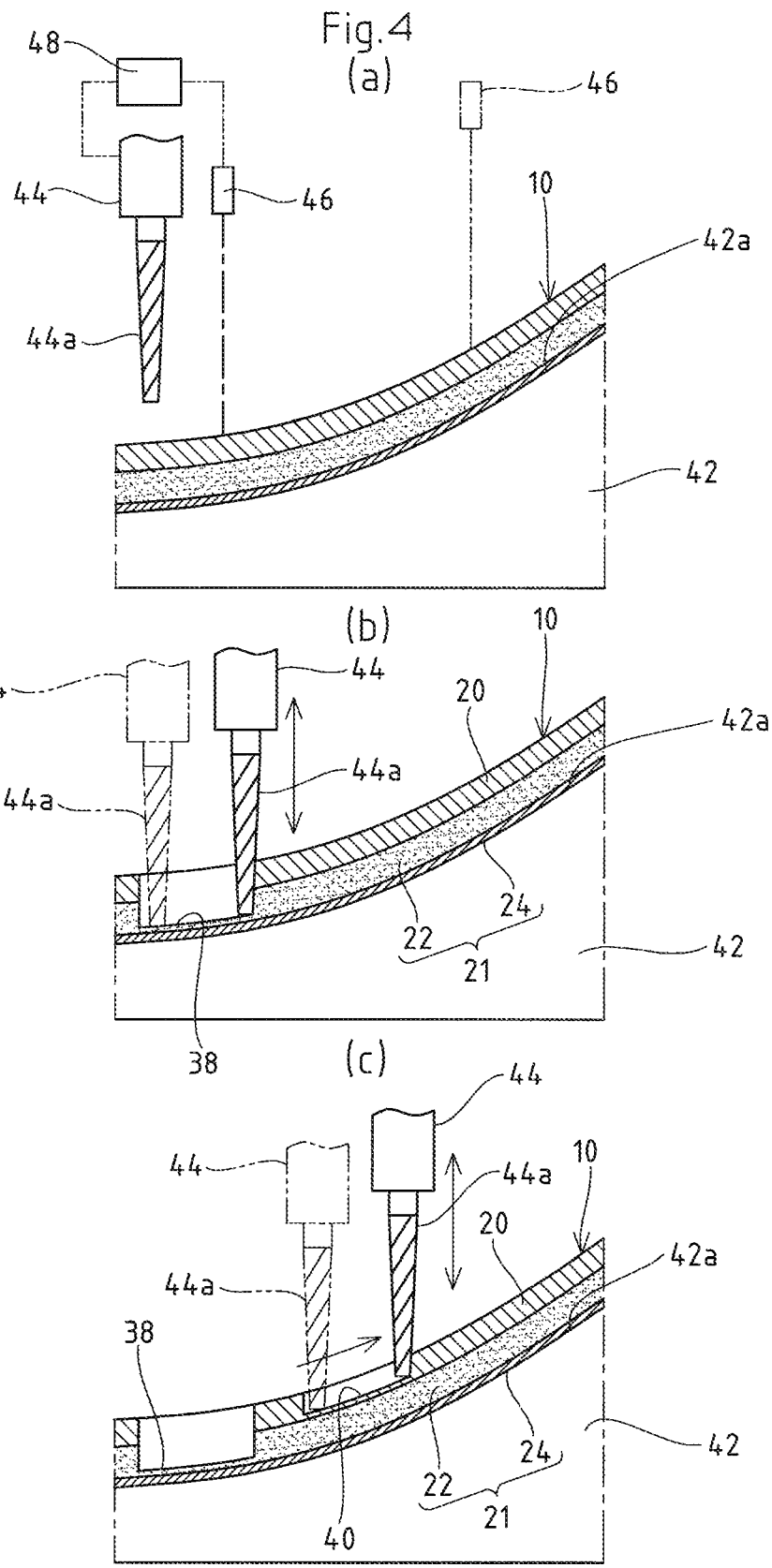
Figure 5:
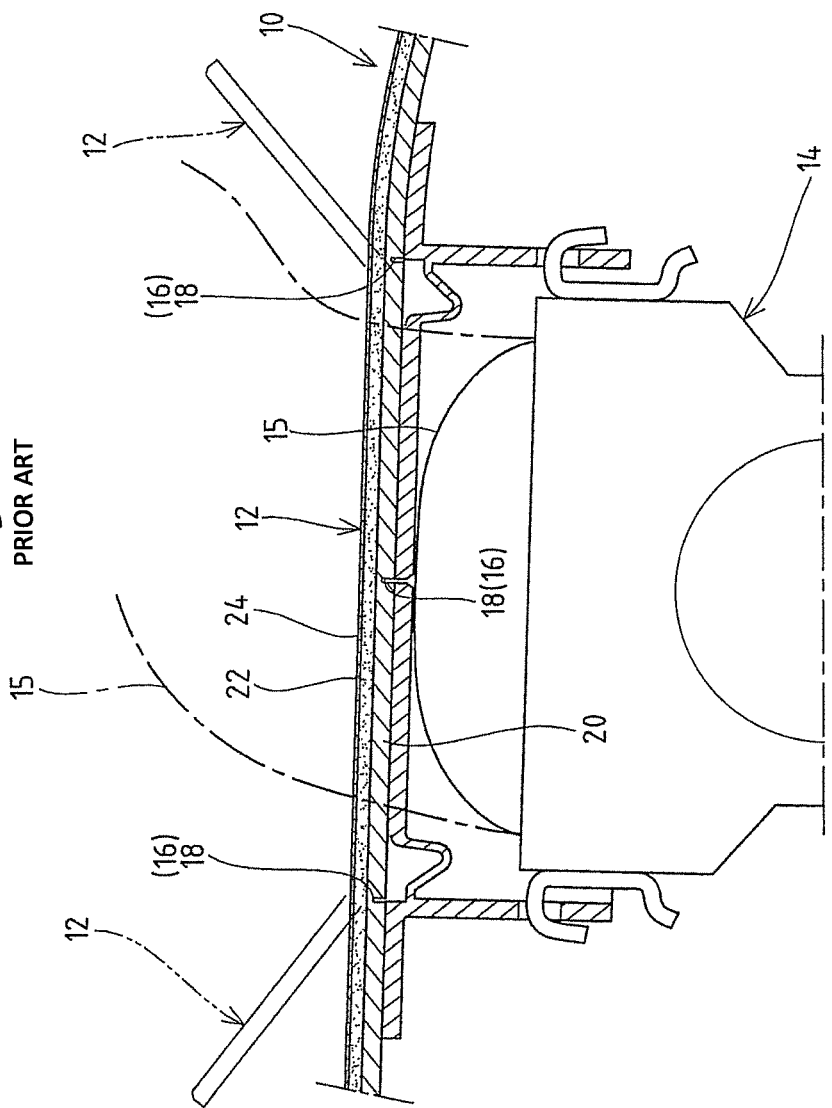
FIG. 5 is a sectional view showing an air bag door formed in a vehicle instrument panel and an air bag device.

When forming the first grooves 38 particularly, as shown in FIG. 4(*b*), the forward and backward (up and down) movement of the working means 44 in the Z axial direction is controlled such that the tip position of the end mill 44a of the working means 44 is constant with respect to the position of the set surface 42a in the Z axial direction that is set in advance in the control means 48. Further, the tip position of the end mill 44a of the working means 44 is controlled so as to be constant with respect to the set surface 42a, thus making it possible to allow the remaining thickness of the layered materials 21 between the bottom of the first groove 38 and the designed surface of the instrument panel 10 to he constant.

In contrast thereto, when forming the second grooves 40, as shown in FIG. 4(*c*), the tip position of the end mill 44a of the working means 44 is controlled so as to move forward and backward (up and down) in the Z axial direction with respect to the Z axial direction of the set surface 42a that is preset in the control means 48 depending on the above-mentioned data corrected by the measuring step. More specifically, when the measured size of thickness of the instrument panel 10 is thicker (greater) than the referential size of thickness, a correction is made in a direction getting away from the set surface 42a only for the error; and when the measured size of thickness of the instrument panel 10 is thinner (smaller) than the referential size of thickness, a correction is made in a direction getting closer to the set surface 42a only for the error. In this manner, the working means 44 forms the second groove 40 at a certain depth from the back surface side of the instrument panel 10 (substrate 20) to allow the remaining thickness of the substrate 20 due to the formed second groove 40 to be constant. In the instrument panel 10, the precision of the size of the layered materials 21 including the foamed layer 22 is inferior compared with the substrate 20 which is relatively good in precision of the size due to injection molding, and thus most of the error in the size of thickness of the instrument panel 10 is derived from the precision per se of the layered materials 21. Accordingly, when forming the second grooves 40, by correcting the working means 44 so as to be closer to or away from the set surface 42a, it becomes possible to make the depth of formation of the substrate 20 by the working means 44 constant even if there is an error in the layered materials 21. In other words, if the depth of formation of the second groove 40 from the back surface of the substrate 20 is constant, then the remaining thickness of the substrate at the second groove 40 can be constant, since the precision of the size of the substrate 20 is relatively good as mentioned above.

The working means 44 is moved in the X-Y axial direction so as to trace the prearranged rupture lines 34 and 36 of the prearranged rupture portion 32 preferably in a unicursal manner to consecutively form the first grooves 38 and the second grooves 40 which are present in a mixed manner along the prearranged rupture lines 34 and 36. The term "consecutively" referred to in the description means consecutiveness during the movement of the working means 44 in the X-Y axial direction along the prearranged rupture lines 34 and 36, and includes adjoining grooves 38 and 40 spaced apart from each other and adjoining grooves 38 and 40 linked with each other. In other words, only one set of grooves 38,40 are formed and then the other set of grooves 40,38 are for med, the working means 44 is not allowed to be moved regardless of the prearranged rupture lines 34,36, and thus the time required to form the prearranged rupture portion 32 can be shortened.

In this manner, according to the manufacturing method of the present invention, even if there is an error in size of thickness of the layered materials 21, the remaining thickness of the layered materials 21 due to the formed first groove 38 can be managed precisely, and also the remaining thickness of the substrate due to the formed second groove 40 can be managed precisely as well. Further, since the measuring step by the measuring means 36 is carried out for each one of the instrument panels 10, it is possible to cope with the variance in sizes of thickness of the layered materials 21 for each one of the instrument panels 10. In addition, not the entire back surface of the substrate 20 is measured by the measuring step 46, but only a plurality of points of the formation expected sections for the grooves 38 and 40 are measured, so that it is possible to shorten the time required for the measurement. Further, since the position of the back surface of the substrate 20 is measured by the measuring means 46 prior to the formation of the first grooves 38 and the second grooves 40, even if the first grooves 38 and the second grooves 40 are consecutively formed along the prearranged rupture lines 34 and 36 of the prearranged rupture portion 32, wait for measurement with the measurement means 46 does not occur, so that the prearranged rupture portion 32 can be formed in a short period of time.

The present invention is not limited to the above-described steps of the method, but modifications are also possible as follows.

(1) The present invention is not limited to the instrument panel, and it is also applicable to, for example, a lid of a glove box and other vehicle interior members.

(2) The layered materials are not limited to those having a multi-layered structure and can also be formed only from a surface skin. Further, a foamed layer may be structured to be filled with foam between the surface skin and the substrate, and the surface skin and the foamed layer can be integrated.

(3) The working means can be an end mill, milling cutter, thermal blade, ultrasonic cutter, or cold knife that may cut by itself into the instrument panel to form a groove. Further, the instrument panel can be one that is formed from a synthetic resin material so that it is partially fused by the radiation of a laser to form a groove.

(4) As a measuring means, a non-contact distance measuring equipment using an electromagnetic wave such as laser, light or radio wave, or other types such as magnetism may be employed.

What is claimed is:

1. A method for forming a prearranged rupture portion for an air bag door in a vehicle interior member composed of a substrate and layered materials covering a surface of the substrate in which the rupture portion comprises a first groove perforating from a back surface of the substrate through the substrate to reach the layered materials and a second groove formed only in the back surface of the substrate, the method comprising the steps of:

setting the vehicle interior member so that a surface of the layered materials is in touch with a set surface of a fixing means formed so as to adapt to the surface of the layered materials;

measuring a position of the back surface of the substrate by a measuring means; and forming the first and second grooves by a working means, wherein when forming the first groove, a depth of the first groove formed by the working means is controlled with reference to a preset position of the set surface of the fixing means so as to ensure a residual thickness size of the layered materials; and when forming the second groove, a depth of the second groove formed by the working means is controlled with reference to the position of the back surface of the substrate measured by the measuring means so as to ensure a residual thickness size of the substrate.

2. The method for forming a prearranged rupture portion for an air bag door according to claim 1, wherein when forming the second groove, a control means controls the depth of the second groove to be cut by the working means so as to correct operational data by as much as an error between a measured actual size of thickness of the vehicle interior member and a preset referential size of the thickness of the vehicle interior member, the measured actual size being calculated from positional data of the set surface of the fixing means on which the vehicle interior member is set and the position of the back surface of the substrate measured by the measuring means.

3. The method for forming a prearranged rupture portion for an air bag door according to claim 1, wherein the measuring means measures a plurality of points of a working expected section of the grooves.

4. The method for forming a prearranged rupture portion for an air bag door according to claim 1, wherein the working means, while moving along a formation expected line, consecutively forms the first groove and the second groove which are present in a mixed manner along the formation expected line for the prearranged rupture portion.

5. The method for forming a prearranged rupture portion for an air bag door according to claim 2, wherein the measuring means measures a plurality of points of a working expected section of the grooves.

* * * * *